United States Patent Office 2,698,556
Patented Jan. 4, 1955

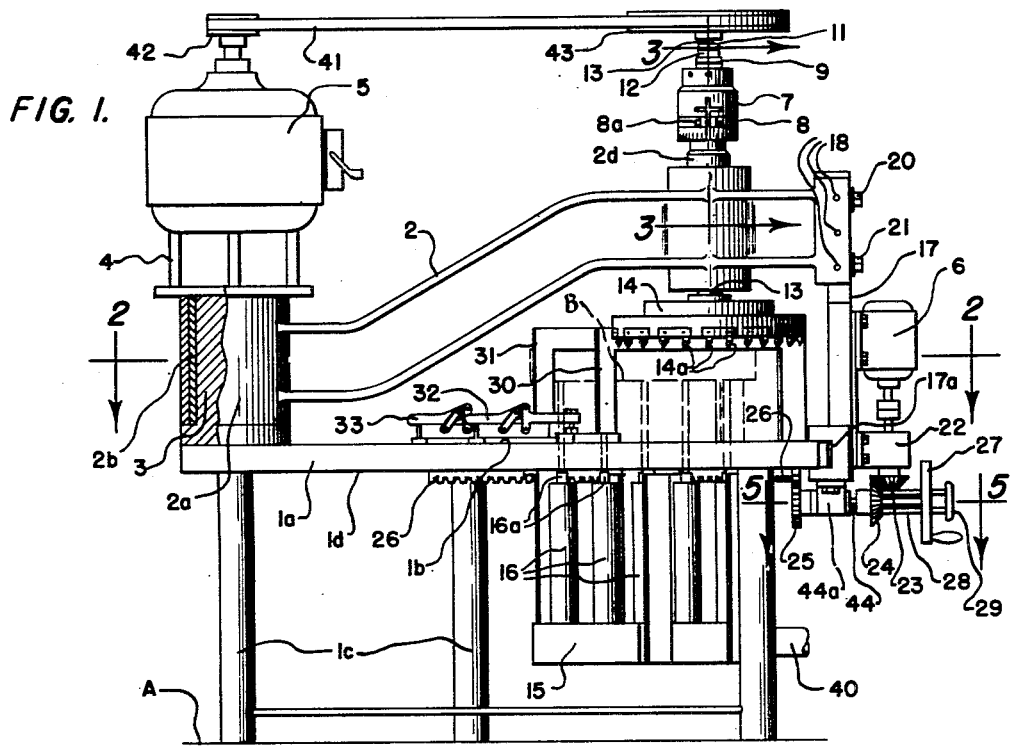
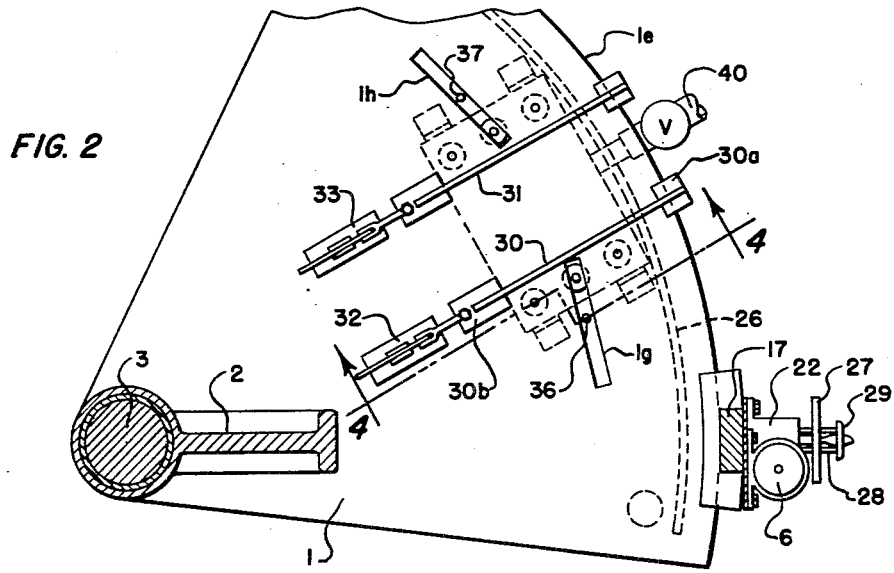

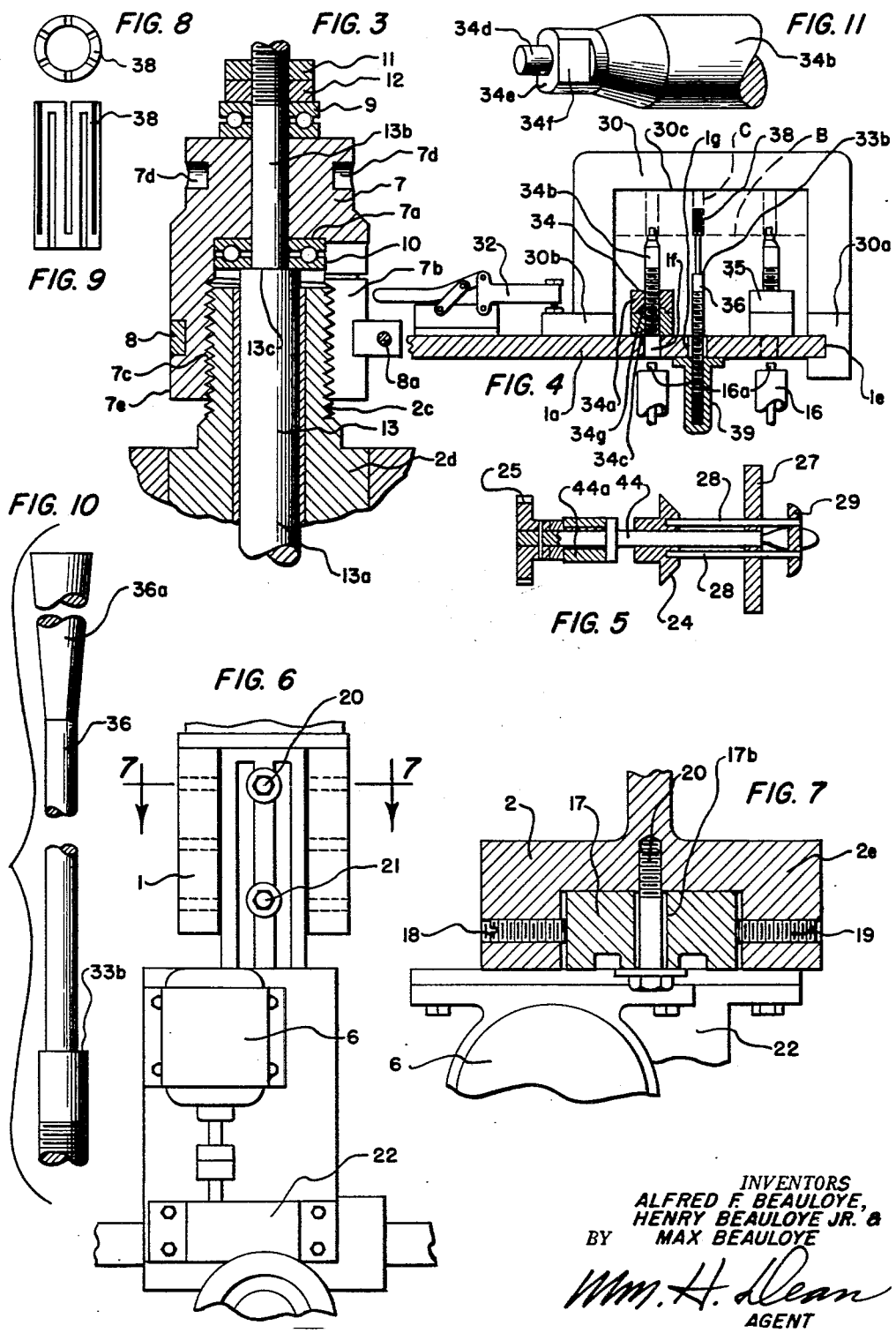

2,698,556

CYLINDER HEAD REFINISHING MACHINE

Alfred F. Beauloye, Henry Beauloye, Jr., and Max Beauloye, San Diego, Calif.

Application October 2, 1950, Serial No. 188,016

6 Claims. (Cl. 90—15)

Our invention relates to a cylinder head refinishing machine, and more particularly to a machine for milling the gasket surfaces of internal combustion engine cylinder heads, and the objects of our invention are:

First, to provide a machine of this class having a cutter adapted to move over a stationary table, whereby the cylinder heads may be readily and quickly set up on the stationary table, preliminary to the movement of the cutter thereover;

Second, to provide a machine of this class having novel set-up facilities for cylinder heads preliminary to milling, which include bridges adapted to be aligned quickly parallel to the upper surface of the machine table, and air cylinders for forcing said head into engagement with said bridges, so that jacks and hold-down bolts may be installed in engagement with the cylinder head while said bridges maintain the gasket-engaging surface of said cylinder head exactly parallel to the plane of the machine cutter and surface of the table on which said jacks are supported;

Third, to provide a cylinder head refinishing machine of this class in which cylinder heads may be quickly set up by engagement of air cylinders mounted below the table of the machine, which hold a cylinder head in engagement with set-up bridges until jacks and holddown bolts are installed in connection therewith;

Fourth, to provide a machine of this class having a horizontal table on which work set-up bridges are very easily and quickly installed or removed, for indexing the gasket-engaging planes of a cylinder head on a parallel plane to the cutting plane of the machine, within very close tolerances, whereby the gasket-engaging surfaces of cylinder heads may be precisely refinished to a certain tolerance throughout their entire areas;

Fifth, to provide a cylinder head refinishing machine of this class in which set-up bridges provide initial indexing of the gasket-engaging surface of cylinder heads, which precisely coincides with the zero setting of the milling cutter of said machine, so that an adjustment of the cutter may be made to remove a predetermined dimensional cut from the gasket-engaging surface of a cylinder head without making any measurements in setting up the work;

Sixth, to provide a cylinder head refinishing machine of this class having a stationary table and a revolving milling cutter mounted on a swinging arm which passes over the table, whereby set-up of work on the table is greatly facilitated;

Seventh, to provide a machine of this class which greatly reduces the overall time required to set up and mill or refinish internal engine combustion cylinder heads;

Eighth, to provide a machine of this class having novel feed mechanism which automatically disengages as the milling cutter passes over the table of the machine to a certain position, whereby the operator may set up the work on the machine and leave it unattended to finish the job;

Ninth, to provide a machine of this class having a novel work set-up mechanism in which air cylinders support the work in engagement with precision set-up bridges until jacks and holddown screws are installed in connection with the work preliminary to machining the same;

Tenth, to provide a machine of this class having a revolving cutter having novel micrometer adjusting means adapted to adjust the position of the cutter longitudinally of its axis; and Eleventh, to provide a machine of this class which is very simple and economical of construction in proportion to its utility, efficient in its action, and which will not readily deteriorate or get out of order.

With these and other objects in view, as will appear hereinafter, our invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Fig. 1 is a side elevational view of our cylinder head refinishing machine, showing portions thereof broken away and in section to amplify the illustration; Fig. 2 is a sectional view thereof, taken from the line 2—2 of Fig. 1; Fig. 3 is an enlarged fragmentary sectional view, taken from the line 3—3 of Fig. 1; Fig. 4 is an enlarged fragmentary sectional view, taken from the line 4—4 of Fig. 2; Fig. 5 is an enlarged sectional view, taken from the line 5—5 of Fig. 1; Fig. 6 is an enlarged fragmentary front elevational view of our cylinder head refinishing machine; Fig. 7 is an enlarged fragmentary sectional view, taken from the line 7—7 of Fig. 6; Fig. 8 is an end view of one of the holddown expansion bushings used for holding down cylinder heads to the worktable of our machine; Fig. 9 is a side elevational view of the expansion bushing shown in Fig. 8; Fig. 10 is a fragmentary side elevational view of the cylinder head holddown bolts of our cylinder head refinishing machine; and Fig. 11 is an enlarged fragmentary view of the upper end of one of the jack screws of our machine.

Similar characters of reference refer to similar parts and portions throughout the several views of the drawings.

The table 1, cutter head arm 2, bearing 3, motor mount 4, motors 5 and 6, micrometer head 7, micrometer head adjusting band 8, thrust bearings 9 and 10, nuts 11 and 12, cutter shaft 13, cutter head 14, air cylinder base 15, air cylinders 16, arm guide 17, adjustment screws 18 and 19, fastening bolts 20 and 21, gear box 22, gears 23, 24 and 25, gear rack 26, hand wheel 27, slide bars 28, knob 29, bridges 30 and 31, holddown clamps 32 and 33, jacks 34 and 35, holddown bolts 36 and 37, expansion sleeves 38, nuts 39, compressed air conductor 40, belt 41, pulleys 42 and 43, and the shaft 44, constitute the principal parts and portions of our cylinder head refinishing machine.

The table 1 is provided with a heavy rigid table-top member 1a, having a flat upper surface 1b over which the cutter head arm 2 is pivotally mounted about the axis of the bearing 3, which is fixed to the table top member 1a, all as shown best in Fig. 1 of the drawings. The table top member 1a is supported by legs 1c which rest upon the floor surface A, shown in Fig. 1 of the drawings. The cutter head arm 2 is provided with the bearing sleeve 2a, having a bushing 2b therein surrounding the bearing 3, and the motor mount 4 is fixed to the upper end of the bearing 3 and supports the motor 5, which is provided with a pulley 42, engaged by the belt 41, which passes over the pulley 43 on the upper end of the cutter shaft 13.

This cutter shaft 13, as shown in Fig. 3 of the drawings, is provided with an enlarged diameter portion 13a and a reduced diameter portion 13b, on which the bearings 9 and 10 are positioned. These bearings 9 and 10 are thrust bearings, and are fixed in opposed pre-loaded relationship to each other abutting opposed portions of the micrometer head 7, through which the shaft portion 13b extends. At the transition 13c of the shaft portions 13a and 13b, one side of the thrust bearing 10 is abutted, and the opposite thereof is abutted to an internal shoulder 7a in the micrometer head 7. The upper end of the micrometer head 7 provides an abutment for the thrust bearing 9, and the jamb nuts 11 and 12 provide a fixed adjustable abutment for the bearing 9, in opposed relation to the upper end of the micrometer head 7, which promotes preliminary loading of the bearings 9 and 10 to eliminate end-play of the shaft 13.

It will be noted that the micrometer head 7 is provided with a slotted portion 7b, and that the micrometer head adjusting band 8 surrounds this slotted skirt portion of the micrometer head 7, permitting adjustment of the internal threads 7c of the micrometer head 7 to the external screw-threads 2c of the bushing 2d in the arm 2, all as shown best in Fig. 3 of the drawings. The micrometer head adjusting band 8 is provided with a bolt 8a, which is adapted to circumferentially tighten said band, causing the internal threads 7c to intimately engage the external screw-threads 2c, hereinbefore described, eliminating the end play tolerance therein.

The micrometer head 7 is provided with wrench-engaging recesses 7d, which are adapted to be engaged by an adjusting wrench for adjusting the shaft 13 longitudinally of its axis, in order to adjust the cutter head 14, which is fixed to the lower end of the shaft 13, below the arm 2.

It will be here noted that the bushing 2d is fixed to the arm 2, and that the shaft 13 is revolubly mounted in the bushing 2d and carries the cutter head 14 on the lower end thereof. The cutting plane of the cutter head 14 is horizontal and parallel to the upper surface 1b of the table top 1a. The cutter head 14 is provided with a plurality of cutter bits 14a, which are removably and adjustably fixed to the cutter head 14.

Positioned below the table top member 1a is the air cylinder base 15, on which the air cylinders 16 are fixed. This air cylinder base 15 is a hollow base, and communicating therewith is the conductor 40, which supplies air to the interior of the air cylinders 16 for forcing the plungers 16a thereof upwardly, as indicated by dash lines in Fig. 1 of the drawings. Fixed to the lower surface 1d of the table top member 1a is the gear rack 26. This gear rack 26 is an arcuate spur gear rack, spaced concentrically from the arcuate edge 1e of the table top 1a, as shown in Figs. 1 and 2 of the drawings, and in mesh with the gear rack 26 is the spur gear 25, on the shaft 44, which is fixed longitudinally in the bearing 44a in which the shaft 44 rotates.

The gear 24 is slidably mounted on the shaft 44 and is provided with guide rods 28, slidably mounted through the hand wheel 27, fixed on the end of the shaft 44, providing disengageable relationship of the gear 24 with the gear 23, which is operated on the output shaft of the gear box 22, which is connected with the motor 6, which acts as a prime mover for the gear box 22.

The bearing 44a, gear box 22, and motor 6, are all mounted on the arm guide 17, which is provided with a U-shaped engaging portion 17a, which engages the upper and lower surfaces 1b and 1d of the table top member 1a at the arcuate portion 1e thereof. The upper end of the arm guide 17 is fixed to the cutter head arm 2 by means of the screws 20 and 21, which extend through enlarged holes 17b in the arm guide 17, and which are screw-threaded in the cutter head arm 2, all as shown best in Fig. 7 of the drawings.

The adjustment screws 18 and 19 are screw-threaded in the cutter head arm 2 in the U-shaped portion 2e thereof, in which the upper end of the arm guide 17 is positioned. These adjustment screws 18 and 19 provide angular adjustment for the arm guide 17, in order to coincide with the plane of the table top member 1a, and the path of the outboard end of the cutter head arm 2.

The bridges 30 and 31 are U-shaped members having U-shaped blocks 30a, engageable with the arcuate edge 1e of the table top member 1a, as shown best in Fig. 4 of the drawings. The opposite ends of these bridges 30 and 31 are each provided with a foot portion 30b, engageable by a toggle clamp. The toggle clamp 32, as shown in Fig. 4, is a conventional toggle clamp, adapted to provide quick and secure engagement of the bridge 30 with the upper surface 1b of the table top 1a. These bridges 30 and 31 are cylinder head set-up bridges and are identical to each other in shape and dimension. The lower indexing surface 30c of the bridge 30 is precisely parallel to the upper surface 1b of the table top member 1a and is a predetermined distance therefrom and coincides with the zero setting of the cutter head 14 at its cutting plane.

The table top member 1a is provided with openings 1f through which the plungers 16a of the air cylinders 16 may project for engagement with the lower surface of a cylinder head B, as shown by dash lines in Fig. 4 of the drawings. The set-up jacks 34 and 35 are substantially identical to each other, and it will be noted that any number of these jacks, as desired, may be used to support the cylinder head B in accordance with its size, and that these jacks may be placed in various locations out of interference with the plungers 16a of the air cylinders 16. The jack 34 is provided with a nut 34a in which the screw 34b is screw-threaded. This nut 34a is provided with a concentric interlocking shoulder 34g which interlocks with an annular counterpart on the base 34c on which the nut 34a is rotatable. As shown in Fig. 11, the upper end of the screw 34b is provided with a cylinder head bolt hole engaging stub 34d, having a supporting shoulder 34e adjacent thereto, and wrench flats 34f for rotatable adjustment of the screw 34b for attaining engagement of the shoulder 34e with the lower surface of a cylinder head B when setting the same up into engagement with the lower edges 30c of the bridges 30 and 31, it being noted that the gasket-engaging surface of the cylinder head is engaged with said lower edge 30c as shown in Fig. 4 of the drawings.

The holddown bolts 36 and 37 extend through open slots 1g and 1h in the table top member 1a, as shown in Figs. 2 and 4 of the drawings, and the upper ends of these holddown bolts 36 and 37 are tapered. The holddown bolt 36, as shown in Fig. 10 of the drawings, is provided with a downwardly converging tapered portion 36a, and is also provided with a shoulder portion 33b intermediate its ends. The lower end of the holddown bolt 36 is screw-threaded and is engaged with the nut 39, which is adapted to abut the lower surface 1d of the table top member 1a for pulling the holddown bolt 36 downwardly in the conventional expansion bushing 38, shown in Fig. 9 of the drawings, which is inserted in a cylinder head bolt hole, illustrated by dash lines C in Fig. 4 of the drawings.

The operation of our cylinder head refinishing machine is substantially as follows:

When it is desired to mill or refinish a cylinder head, the bridges 30 and 31 are first fixed to the table top member 1a by the toggle clamps 32 and 33, as hereinbefore described, then the cylinder head B is placed below the lower edge portion 30c thereof, as shown in Fig. 4 of the drawings. Then the plungers 16a of the air cylinders 16 are extended by admitting compressed air through the conductor 40 into the hollow base 15, whereby the plungers 16a engage the lower surface of the cylinder head and force the same upwardly into precise contact with said lower edges 30c of the bridges 30 and 31, it being noted that the cylinder head gasket-engaging surface of the cylinder head is engaged with the lower portions 30c, which coincides with the zero setting cutting plane of the cutter head 14.

When the cylinder head B is held in engagement with the bridges 30 and 31 by the plungers 16a of the air cylinders 16, the jacks 34 and 35 are installed as hereinbefore described, by inserting the stubs 34d thereof into the bolt holes of the cylinder head, and the nuts 34a are turned for extending the screws 34b upwardly, which causes secure engagement of the shoulder portions 34e with the lower surface of the cylinder head B surrounding the bolt holes therein. It will be noted that while the nut 34a is being rotated for extending the screw 34b upwardly, the flats 34f are engaged by a wrench in order to prevent the screw 34b from rotating.

After the jacks 34 and 35 are thus positioned under the cylinder head B, holding the same securely against the lower edges 30c of the bridges 30 and 31, the holddown bolts 36 and 37 may be installed by first positioning the expansion bushings 38 in the proper bolt holes in the cylinder head, and then inserting the holddown bolts 36 and 37 from the top side of the cylinder head until the tapered portions 36a engage the expansion bushings 38 internally, causing them to be distended and frictionally engage the interior of the cylinder head bolt holes, thus fixing the holddown bolts 36 and 37 therein. The nuts 39 may then be tightened against the lower surface 1d of the table top member 1a for holding the cylinder head down securely on the jacks 35 and 36. The toggle clamps 32 and 33 then may be removed and the bridges 30 and 31 displaced from the table top member 1a, and the motor 5 may then be started, which causes rotation of the cutter head 14 on the shaft 13.

A predetermined amount may be taken from the gasket-engaging surface of the cylinder head, which is extended uppermost, by adjusting the micrometer head rotatably on the screw-threaded portions 2c of the bushing 2d, as shown in Fig. 3 of the drawings, which longitudinally shifts the shaft 13 downwardly, carrying the cutter head 14 therewith. It will be noted that the outer skirt 7e of the micrometer head 7 is provided with a scale thereon, in thousandths of an inch, which permits the operator to adjust the cutter head 14 downwardly a predetermined amount below its zero setting, which coincides with the lower surfaces 30c of the bridges 30 and 31. Thus, a cylinder head may be quickly set up and an adjustment quickly made for cutting a precise amount from the upper or gasket-engaging surface of the cylinder head.

When the vertical adjustment of the cutter head 14 has been made, and the motor 5 has been started, the gear 24 is engaged with the gear 23 by pulling outwardly on the knob 29, which causes the slide bars 28 to move through the hand wheel 27. The motor 6 is then started, which causes rotation of the gear box mechanism 22, and the gear 25 thereon. The gear 25 then traverses the rack 26, moving the cutter head arm 2 about the axis of the bearing 3, and when the gear 25 passes from the end of the rack 26, motion of the arm 2 stops. Meanwhile, the cutter teeth 14a on the cutterhead 14 smoothly mill the upper gasket-engaging surface of the cylinder head B, said cylinder head illustrated by dash lines B in Figs. 1 and 4 of the drawings.

It will be noted that during passage of the cutter head 14 over the surface of the cylinder head, reverse cutting is accomplished, whereby a smooth finish on the head is attained. The leading portion of the perimeter of the cutter head 14 cuts from one side of the head to the other, while the trailing perimeter portion of the cutter head 14 cuts from the opposite side of the head and proceeds toward the laterally opposite side therefrom.

Though we have shown and described a particular construction, combination and arrangement of parts and portions, and a certain combination, we do not wish to be limited to this particular construction, combination and arrangement, but desire to include in the scope of our invention the construction, combination and arrangement substantially as set forth in the appended claims.

Having thus described our invention, what we claim as new and desire to secure by Letters Patent is:

1. In a cylinder head refinishing machine, the combination of a stationary table, a cutter head arm pivotally mounted thereto on a vertical axis, a motor with a shaft coinciding with said vertical axis, a cutter head rotatably mounted on said arm on a vertical axis, having its cutting plane disposed horizontally, drive means from said motor to said cutter head, micrometer means for vertically adjusting said cutter head relative to said table, bridge means removably engageable with said table, having lower surface portions coinciding with the zero setting and cutting plane of said micrometer head and cutter head, respectively, means for holding a cylinder head against the lower surface portions of said bridge means, jacks adapted to be positioned under cylinder heads for holding the same upwardly against said bridge means, and holddown bolts engageable with cylinder heads for holding the same downwardly on said table and said jacks, permitting said bridge means to be removed from said table.

2. In a cylinder head refinishing machine, the combination of a stationary table, a cutter head arm pivotally mounted thereto on a vertical axis, a motor with a shaft coinciding with said vertical axis, a cutter head rotatably mounted on said arm on a vertical axis, having its cutting plane disposed horizontally, drive means from said motor to said cutter head, micrometer means for vertically adjusting said cutter head relative to said table, bridge means removably engageable with said table, having lower surface portions coinciding with the zero setting and cutting plane of said micrometer head and cutter head, respectively, means for holding a cylinder head against the lower surface portions of said bridge means, jacks adapted to be positioned under cylinder heads for holding the same upwardly against said bridge means, and holddown bolts engageable with cylinder heads for holding the same downwardly on said table and said jacks, permitting said bridge means to be removed from said table, feed mechanism adapted to swing said cutter head arm about the axis of said bearing, causing said cutter head to pass over a cylinder head supported on said jacks above said table.

3. In a cylinder head refinishing machine, a stationary table, a cutter head movably mounted thereon, having a cutting plane parallel to the surface of said table, bridge means detachably connected with said table having indexing portions adapted to coincide with the cutting plane of said cutter head, and adapted to engage the gasket surface of cylinder heads for indexing the same with said cutting plane of said cutter head, means for holding cylinder heads adjacent the indexing surface of said bridge means and means for securing said head to said table surface when said bridge means is removed, said first-mentioned means comprising cylinders having plungers extendable through said table for forcing a cylinder head into engagement with said indexing surface of said bridges, said second-mentioned means comprising jacks for holding said heads adjacent said indexing surfaces of said bridges, and holddown means for holding a cylinder head in engagement with said jacks when said bridge means is removed.

4. In a cylinder head refinishing machine, a stationary table, a cutter head movably mounted adjacent the upper surface thereof having a cutting plane parallel to the surface of such table, bridge means detachably connected with said table having indexing portions adapted to coincide with the cutting plane of said cutter head and adapted to engage the gasket surface of cylinder heads for indexing the same with said cutting plane of said cutter head, means for holding cylinder heads adjacent the indexing surface of said bridge means and means for securing said head to said table when said bridge means is removed and; said first mentioned means comprising vertically adjustable supports, said second means comprising hold-down members for engaging said cylinder heads and forcing the same into fixed position on said first mentioned means relative to said table.

5. In a cylinder head refinishing machine, the combination of a stationary table, a cutter head movably mounted adjacent the upper surface thereof having a cutting plane parallel to the surface of such table, bridge means detachably connected with said table having indexing portions adapted to coincide with the cutting plane of said cutter head and adapted to engage the gasket surface of cylinder heads for indexing the same with said cutting plane of said cutter head, means for holding cylinder heads adjacent the indexing surface of said bridge means and means for securing said head to said table when said bridge means is removed, said first mentioned means comprising vertically adjustable supports.

6. In a cylinder head refinishing machine, the combination of a stationary table, a cutter head movably mounted adjacent the upper surface thereof having a cutting plane parallel to the surface of such table, bridge means detachably connected with said table having indexing portions adapted to coincide with the cutting plane of said cutter head and adapted to engage the gasket surface of cylinder heads for indexing the same with said cutting plane of said cutter head, means for holding cylinder heads adjacent the indexing surface of said bridge means and means for securing said head to said table when said bridge means is removed, said second means comprising hold-down members for engaging said cylinder heads and forcing the same into fixed position on said first mentioned means relative to said table.

References Cited in the file of this patent

UNITED STATES PATENTS

| Number | Name | Date |
|---|---|---|
| 621,022 | Boal | Mar. 14, 1899 |
| 963,904 | Lang | July 12, 1910 |
| 1,210,093 | Middleton | Dec. 26, 1916 |
| 1,460,525 | Wickland | July 3, 1923 |
| 1,513,390 | Hacker | Oct. 28, 1924 |
| 1,689,022 | Graham | Oct. 23, 1928 |
| 1,770,058 | Andrew | July 8, 1930 |
| 2,178,130 | Zwick | Oct. 31, 1939 |
| 2,422,114 | Matter | June 10, 1947 |